United States Patent
Yeh et al.

(10) Patent No.: US 7,538,686 B2
(45) Date of Patent: May 26, 2009

(54) REMOTE CONTROLLER WITH A COMMUNICATION FUNCTION

(75) Inventors: I-Hau Yeh, Hsinchu (TW); Ming-Chang Chiang, Kaohsiung County (TW)

(73) Assignee: Elan Microelectronics Corporation, HsinChu (TW)

( * ) Notice: Subject to any disclaimer, the term of this patent is extended or adjusted under 35 U.S.C. 154(b) by 320 days.

(21) Appl. No.: 11/623,096

(22) Filed: Jan. 15, 2007

(65) Prior Publication Data

US 2007/0273655 A1 Nov. 29, 2007

(30) Foreign Application Priority Data

May 24, 2006 (TW) .............................. 95118418 A

(51) Int. Cl.
*G08C 19/00* (2006.01)
(52) U.S. Cl. .............................. 340/825.72; 340/539.1; 455/420; 379/102.01
(58) Field of Classification Search ............ 340/825.72, 340/10.1, 825.57, 825.71, 825.73; 455/344, 455/74, 420, 556.1; 379/102.01, 102.02, 379/102.03
See application file for complete search history.

(56) References Cited

U.S. PATENT DOCUMENTS

| 5,963,624 | A  | * | 10/1999 | Pope ..................... 379/110.01 |
| 6,909,891 | B2 | * | 6/2005  | Yamashita et al. .......... 455/420 |
| 7,155,213 | B1 | * | 12/2006 | Almeda et al. ............. 455/419 |
| 2004/0259537 | A1 | * | 12/2004 | Ackley ....................... 455/420 |
| 2005/0197113 | A1 | * | 9/2005  | Lin et al. .................... 455/420 |

* cited by examiner

*Primary Examiner*—Toan N Pham
(74) *Attorney, Agent, or Firm*—Winston Hsu

(57) ABSTRACT

A remote controller includes an input module including an input panel and a controller coupled to the input panel for generating coordinate information of the input panel. The remote controller further includes a data transmission interface for transmitting data to an electronic appliance, a microphone for transforming sound waves into audio signals, a speaker for transforming audio signals into sound waves, an image capturing module for capturing and converting image of a user to image signals, an image display module for converting image signals of a remote user received to an image, and a control unit coupled to the input module, the data transmission interface, the microphone, and the speaker, for controlling the data transmission interface to transmit audio or images signals and data corresponding to the coordinate information generated by the controller to the electronic appliance.

14 Claims, 8 Drawing Sheets

REMOTE CONTROLLER WITH A COMMUNICATION FUNCTION

BACKGROUND OF THE INVENTION

1. Field of the Invention

The present invention relates to a remote controller, and more particularly, to the remote controller with a communication function of a phone.

2. Description of the Prior Art

A remote controller has become an essential electronic appliance such as other electronic appliances like televisions, sound systems, lightning, and projectors. FIG. 1 illustrates a functional block diagram of a conventional remote controller 10. The remote controller 10 includes an input panel 12 with a plurality of keys for selecting functions corresponding to the keys; a control module 14, coupled to the input panel 12; and an infrared LED 16, coupled to the control module 14. When the user selects the function corresponding to the key, the input panel 12 transmits an input signal corresponding to the key to the control module 14 controlling the infrared LED 16 to output an infrared signal to an electronic appliance. Once the electronic appliance receives and decodes the infrared signal, the corresponding function, such as adjusting volume or image settings, is executed.

However, the specialization of the remote controller causes the low integration among various electronic appliances and computer system, and the quality of the signal transmission is restricted by the directional character of the transmit medium.

SUMMARY OF THE INVENTION

The claimed invention discloses a remote controller with a communication function. The remote controller comprises an input module with an input panel and a controller for generating coordinate information corresponding to inputs inputted to the input panel. The remote controller may further comprises a data transmission interface for transmitting data to an electronic appliance; a microphone for converting sound waves into audio signals; a speaker for converting audio signals into sound waves; an image capturing module for capturing and converting image of a user to image signals; an image display module for converting image signals of a remote user received to an image; and a control unit coupled to the input module, the data transmission interface, the microphone, the speaker, the image capturing module, and the image display module, for controlling the data transmission interface to transmit audio or image signals and data corresponding to the coordinate information generated by the controller to the electronic appliance.

DETAILED DESCRIPTION

Figure 1:
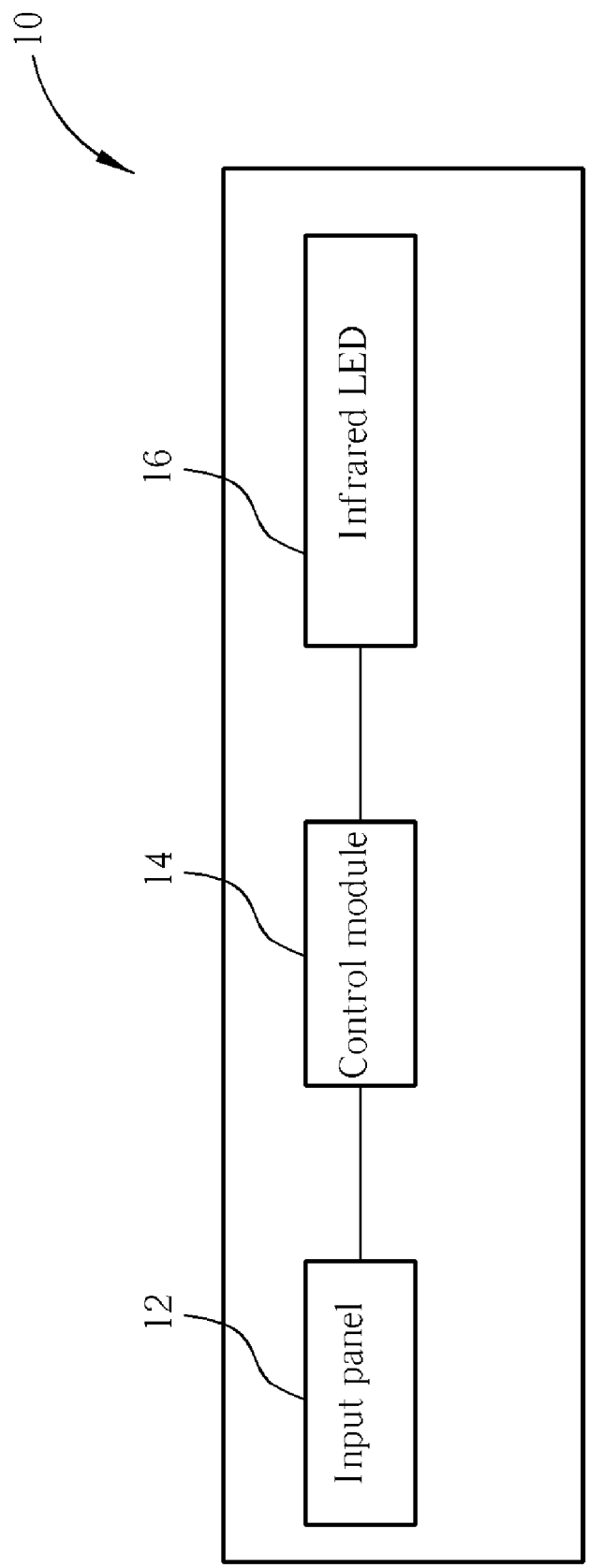
FIG. 1 illustrates to a functional block diagram of a conventional remote controller.
Figure 2:
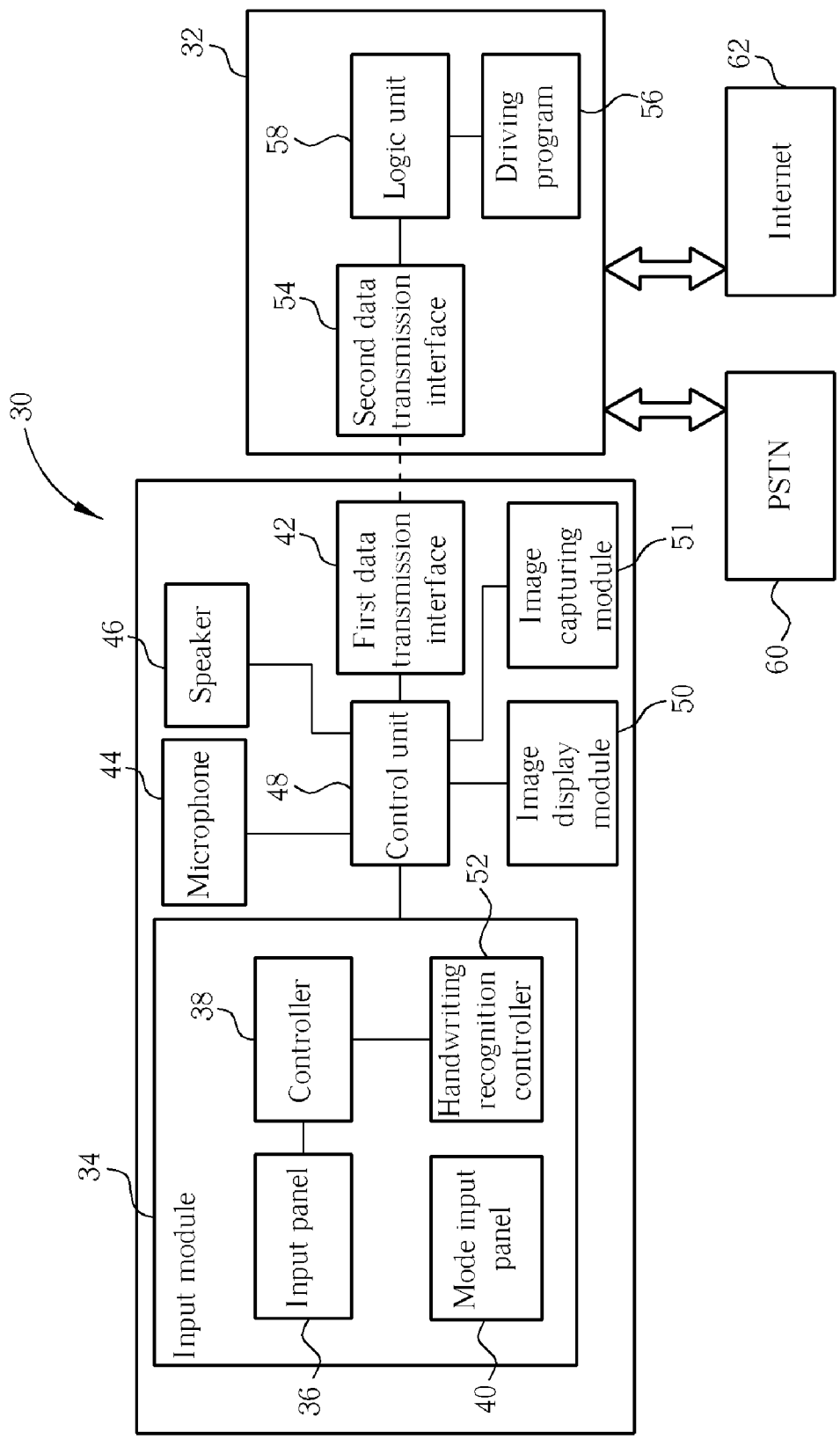
FIG. 2 illustrates a functional block diagram of a remote controller remotely controlling an electronic appliance.

FIG. 2 illustrates a functional block diagram of a remote controller 30 remotely controlling an electronic appliance 32. The electronic appliance 32 can either be, for example, a computer appliance, a set top box, a digital hub, or a multimedia server. The remote controller 30 can be utilized for remotely controlling the electronic appliance 32 and also be a voice over Internet Protocol (VoIP) phone, and it includes an input module 34 including an input panel 36, which can be a touch panel or a touch pad, a controller 38 coupled to the input panel 34 as a touch pad controller for generating coordinate information corresponding to the input panel 36, and a mode input panel 40 for inputting a mode control code corresponding to a remote control mode of the remote controller 30. The remote controller 30 further includes a first data transmission interface 42 for transmitting data to the electronic appliance 32, where the first data transmission interface 42 can be a wireless data transmission interface such as a RF, a Bluetooth, a WiFi or a Zigbee data transmission interface, and it can also be a wired data transmission interface such as a USB, an IEEE 1394 or a UART data transmission interface. As the remote controller 30 also has an Internet phone function, the remote controller 30 further includes a microphone 44 and a speaker 46. Furthermore, the remote controller 30 further includes an image display module 50 coupled to the control unit 48 for displaying mode information corresponding to the mode control code inputted by the mode input panel 40, and for display an image of the opposite party when a visual phone is used. The remote controller 30 further includes an image capturing module 51 coupled to the control unit 48 for capturing an image of a user. The remote controller 30 further includes a control unit 48, such as a USB audio controller, coupled to the input module 34, the first data transmission interface 42, the microphone 44, the speaker 46, the image display module 50, and the image capturing module 51 for controlling the first data transmission interface 42 to transmit audio or image signals and data corresponding to the coordinate information generated by the controller 38 to the electronic appliance 32. The remote controller 30 further includes a handwriting recognition controller 52 coupled to the controller 38 for converting the coordinate information generated by the controller 38 into corresponding human interface device code (HID code) or character code. In addition to installing the handwriting recognition controller 52 within the remote controller 30, the present invention can also install the handwriting recognition controller 52 within the electronic appliance 32 end.

Also, at the electronic appliance 32 end, the electronic appliance 32 includes a second data transmission interface 54 for receiving audio or image signals transmitted from the first data transmission interface 42 or data corresponding the coordinate information, HID codes or character codes generated by the controller 38; a driving program 56 for processing remote control information to drive the operation of the corresponding hardware or software; and a logic unit 58 for controlling the electronic appliance 32 to execute the corresponding operation according to the information transmitted from the remote controller 30. The electronic appliance 32 can be connected to a public telephone network (PSTN) 60, and the user can dial a conventional telephone through the remote controller 30 and the electronic appliance 32. The electronic appliance 32 can also be connected to the Internet with an Internet phone software (such as Skype) of the electronic appliance 32.

Figure 3:
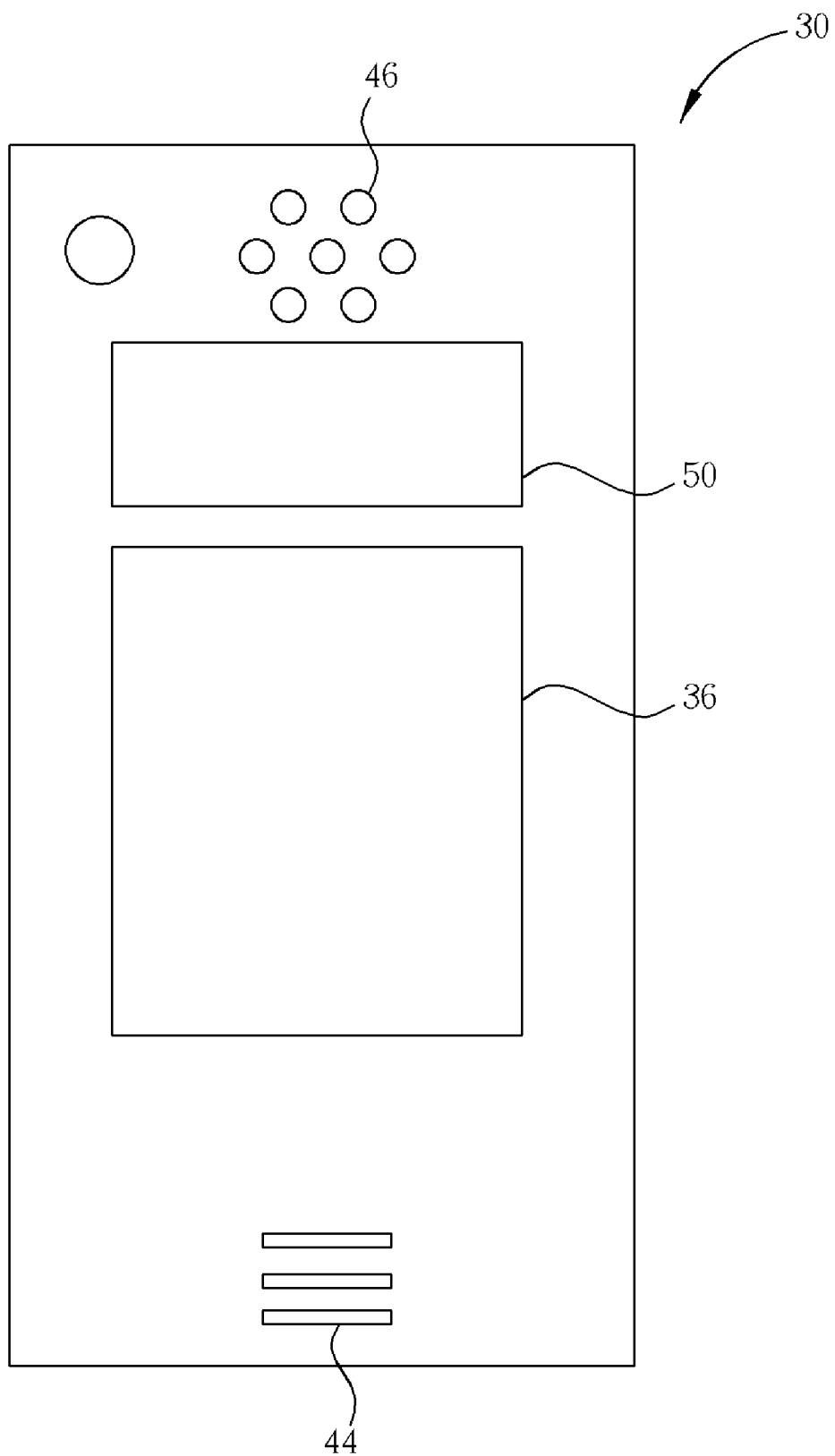
FIG. 3 illustrates an external view diagram of a remote controller of the present invention.
Figure 4:
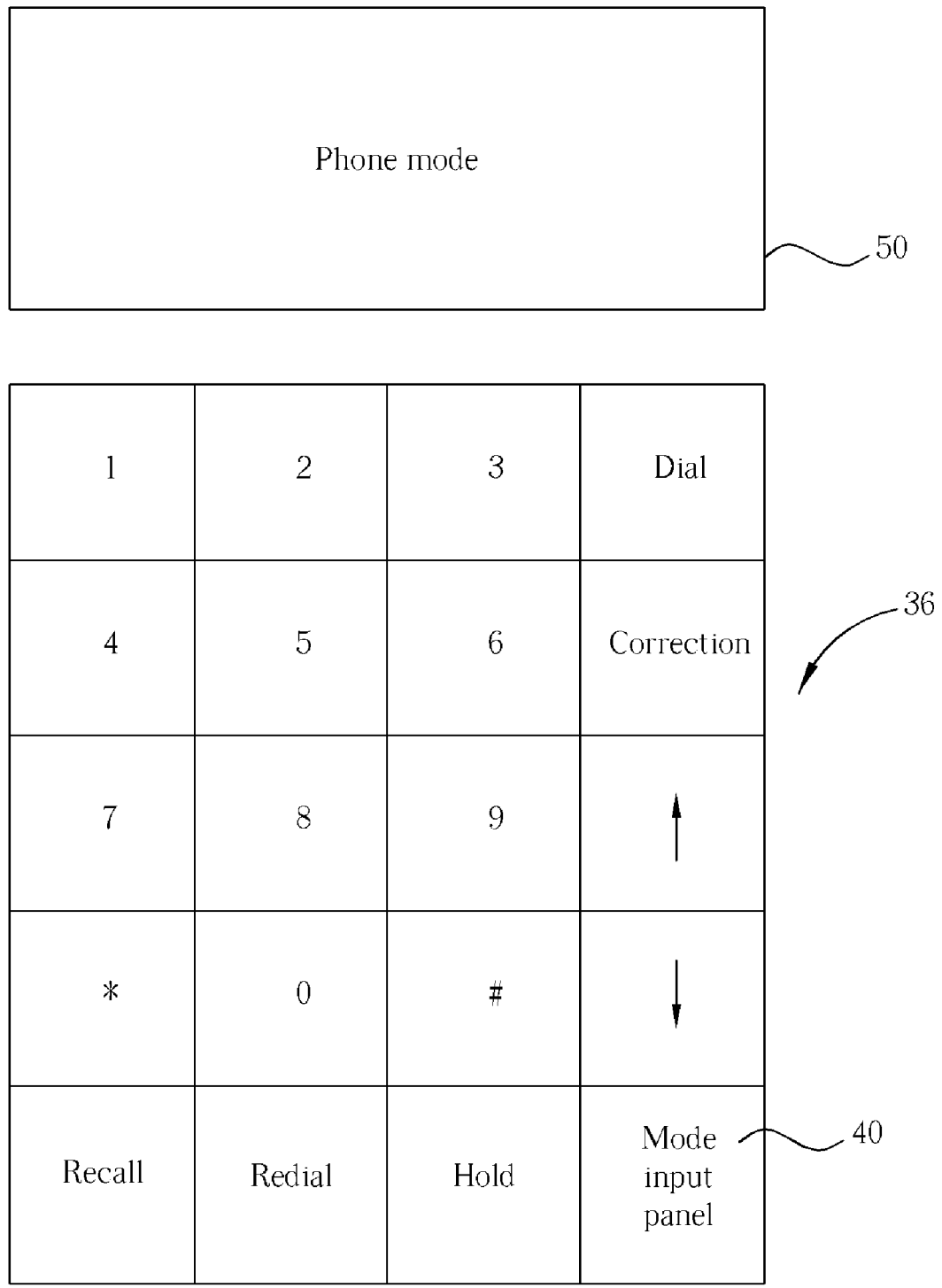
FIG. 4 illustrates a diagram of a display module and an input panel under a phone mode of the present invention.
Figure 5:
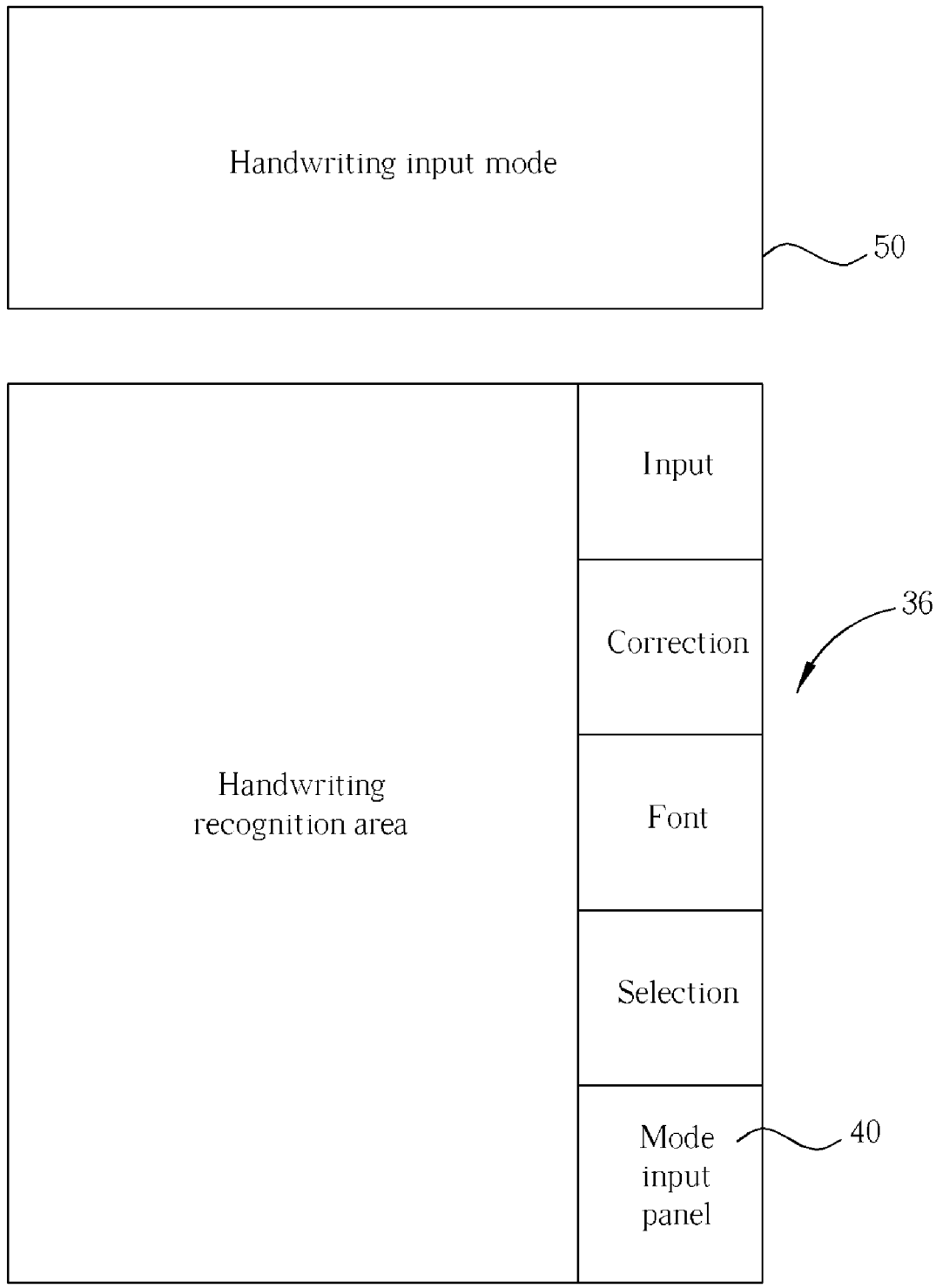
FIG. 5 illustrates a diagram of a display module and an input panel under a handwriting input mode of the present invention.
Figure 6:
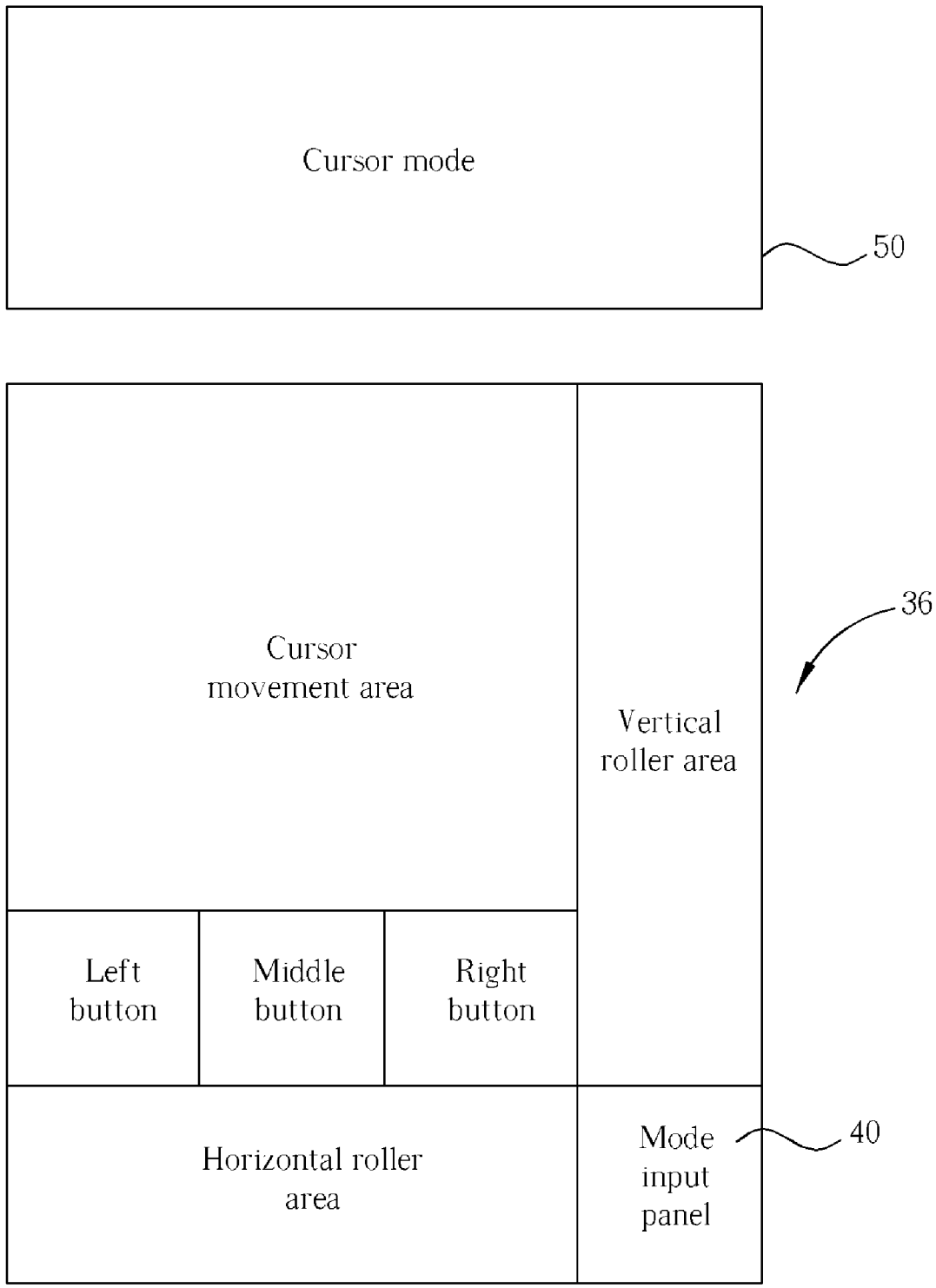
FIG. 6 illustrates a diagram of a display module and an input panel under a cursor mode of the present invention.
Figure 7:
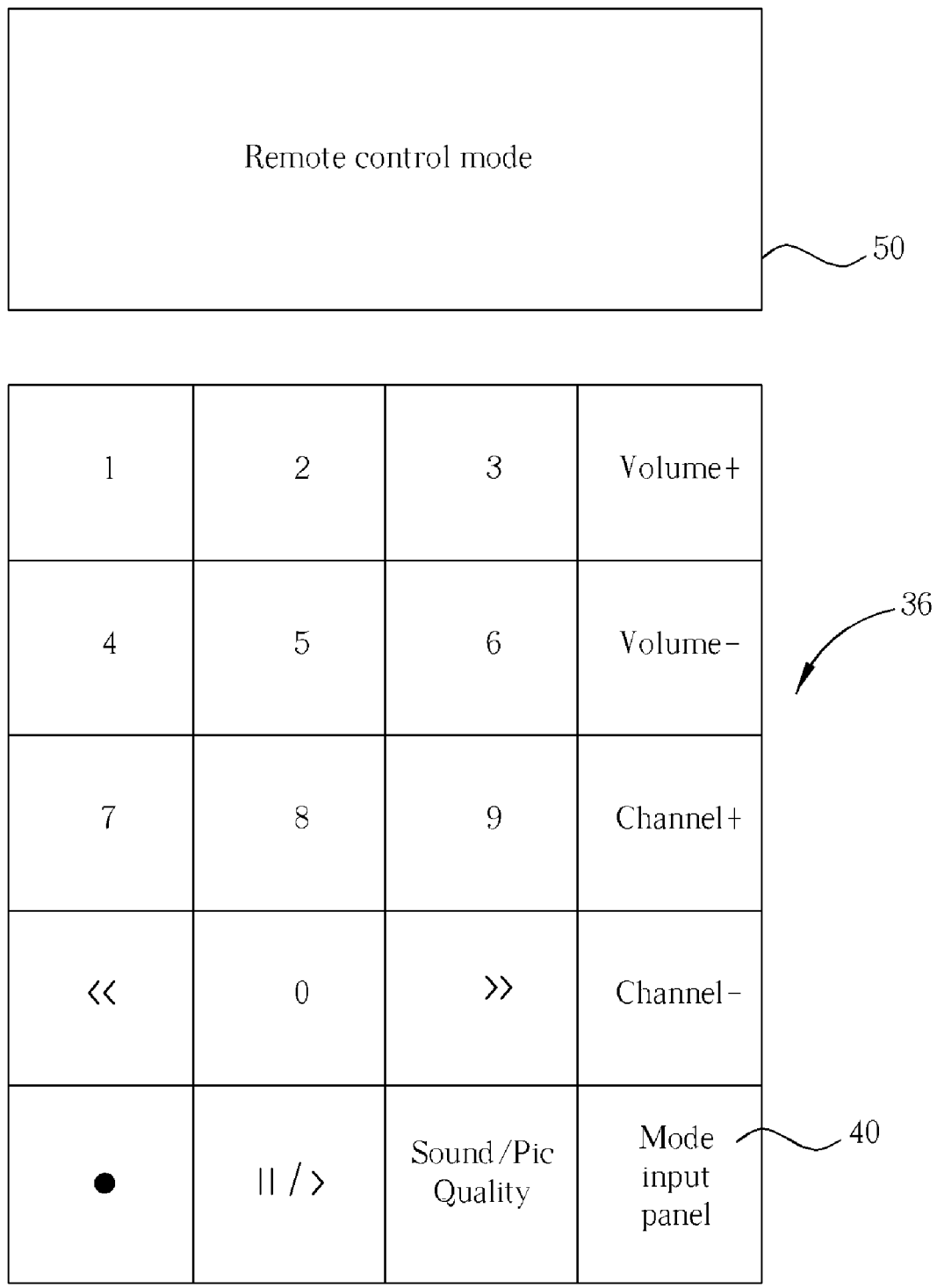
FIG. 7 illustrates a diagram of a display module and an input panel under a remote control mode of the present invention.
Figure 8:
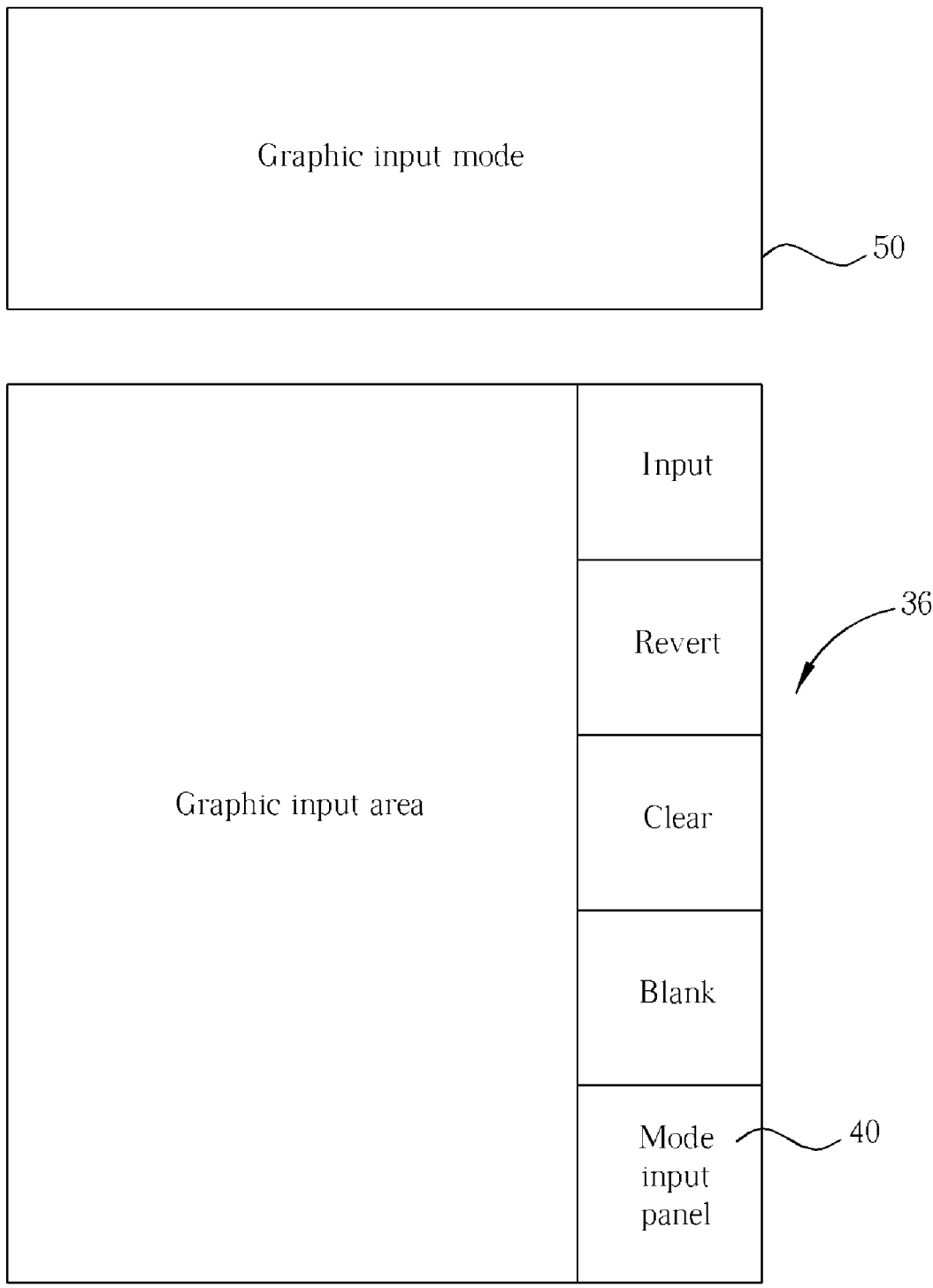
FIG. 8 illustrates a diagram of a display module and an input panel under a graphic input mode of the present invention.

Please refer to FIG. 3 through FIG. 8. FIG. 3 illustrates an external view diagram of a remote controller 30. FIG. 4 illustrates a diagram of the image display module 50 and the input panel 36 under a phone mode of the remote controller 30. FIG. 5 illustrates a diagram of the image display module 50 and the input panel 36 under a handwriting input mode of the remote controller 30. FIG. 6 illustrates a diagram of the image display module 50 and the input panel 36 under a cursor mode of a remote controller 30. FIG. 7 illustrates a diagram of the image display module 50 and the input panel 36 under a remote control mode of the remote controller 30. FIG. 8 illustrates a diagram of the image display module 50 and the input panel 36 under a graphic input mode of the remote controller 30. The input panel 36 of the input module 34 can be programmed having several virtual key zones. Later, when a user utilizes the mode input panel 40 on the input panel 36 to switch to a different mode, the input panel 36 can display the virtual key zone corresponding to the selected mode.

As illustrated in FIG. 4, when the user utilizes the mode input panel 40 to switch the remote controller 30 to the phone mode, the image display module 50 can display, for example, the letters "Phone mode" to notify the user that the remote controller 30 is now in the phone mode. At this time, the input panel 36 can display a screen showing a phone dial. In other words, the different key zone of the input panel 36 is defined to be a numeric function, and when the user touches the defined area, the controller 38 coupled to the input panel 36 will generate and transmit a corresponding coordinate information to the handwriting recognition controller 52. The handwriting recognition controller 52 can differentiate the numeric information corresponding to the coordinate information to convert the information to human interface device code (HID code). The control unit 48 will control the first data transmission interface 42 to transmit the HID code to the second data transmission interface 54 of the electronic appliance 32. After the electronic appliance 32 receives the HID code, the logic unit 58 will execute the corresponding operation according to a process result of the driving program 56. For example, such as executing the Internet phone dialing or listening operations. If the remote controller 30 is under the phone mode when the electronic appliance 32 is connected to the Internet 62, the user can make an Internet call through the connection of the Internet 62. If the remote controller 30 is under the phone mode when the electronic appliance 32 is not connected to the Internet 62, the user can make a conventional phone call through the connection of PSTN. When the electronic appliance 32 receives an incoming call, the remote controller 30 can automatically switch to a phone mode, and the call can be received (i.e., accepted) through, for example, a finger touch on the key. Later, when the call is ended, the remote controller 30 will return to its previous mode. During the phone conversation, the user's image captured by the image capturing module 51 can be converted to image signals and to be transmitted to the other party's phone, also the other party's image will be relatively displayed on the image display module 50. When the phone conversation ends, the image is shut down, and the image display module 50 only displays the current operating mode of the remote controller 30.

As illustrated in FIG. 5, when the user utilizes the mode input panel 40 to switch the remote controller 30 to the handwriting input mode, the image display module 50 can display, for example, the letters "Handwriting input mode" to notify the user that the remote controller 30 is now in the handwriting input mode. At this time, the input panel 36 can display a screen showing a handwriting recognition panel, the controller 38 will generate and transmit a corresponding coordinate information to the handwriting recognition controller 52 according to the touch trail received by the input panel 36, and the handwriting recognition controller 52 can differentiate the letter information corresponding to the coordinate information to convert the information to corresponding code such as Unicode. The control unit 48 will control the first data transmission interface 42 to transmit the code to the second data transmission interface 54 of the electronic appliance 32. After the electronic appliance 32 receives the code, the logic unit 58 will execute the corresponding operation according to a process result of the driving program 56, such as executing the operation of displaying the letters corresponding to the code.

As illustrated in FIG. 6, when the user utilizes the mode input panel 40 to switch the remote controller 30 to the cursor mode, the image display module 50 can display, for example, the letters "Cursor mode" to notify the user that the remote controller 30 is now in the cursor mode. At this time, the input panel 36 can display a screen showing an input panel to simulate related functions of a mouse such as movement of the cursor, left/middle/right mouse buttons, and a roller. The controller 38 will generate and transmit corresponding coordinate information to the handwriting recognition controller 52 according to the touch trail received by the input panel 36. The handwriting recognition controller 52 can differentiate the movement of the coordinate position corresponding to the coordinate information and convert the information into corresponding HID code. The control unit 48 will control the first data transmission interface 42 to transmit the HID code to the second data transmission interface 54 of the electronic appliance 32. After the electronic appliance 32 receives the HID code, the logic unit 58 will execute the corresponding operation according to a process result of the driving program 56. For example, when the finger of the user moves vertically on the movement area, the mouse cursor in the monitor will move according to the vertical movement, and when the user's finger moves horizontally on the movement area, the mouse cursor in the monitor will move according to the horizontal movement, and when the finger clicks respectively on the left/middle/right buttons, this action actually represents the clicking of the left/middle/right buttons of the mouse being touched/clicked.

As illustrated in FIG. 7, when the user utilizes the mode input panel 40 to switch the remote controller 30 to the remote control mode, the image display module 50 can display, for example, the letters "Remote control mode" to notify the user that the remote controller 30 is now in the remote control mode. At this time, the input panel 36 can display a screen showing a remote control panel to display related functions of home appliances (e.g., such as a television or a video player). When the user touches a predetermined area, the controller 38 coupled to the input panel 36 will generate and transmit corresponding coordinate information to the handwriting recognition controller 52. Next, the handwriting recognition controller 52 can differentiate the information corresponding to the coordinate information to convert the information to a corresponding HID code. The control unit 48 will control the first data transmission interface 42 to transmit the HID code to the second data transmission interface 54 of the electronic appliance 32. After the electronic appliance 32 receives the HID code, the logic unit 58 will execute the corresponding operation executing the operation of changing channels, controlling the volume, or adjusting image quality of the television according to a process result of the driving program 56.

As illustrated in FIG. 8, when the user utilizes the mode input panel 40 to switch the remote controller 30 to the graphic input mode, the image display module 50 can display, for example, the letters "Graphic input mode" to notify the user that the remote controller 30 is now in the graphic input mode. At this time, the input panel 36 can display a screen showing a drawing panel for the user to modify inputted picture, the controller 38 will generate and transmit a corresponding coordinate information to the handwriting recognition controller 52 according to the touch trail received by the input panel 36, the handwriting recognition controller 52 can differentiate the movement of the coordinate position corresponding to the coordinate information to convert the information to a corresponding HID code. The control unit 48 will control the first data transmission interface 42 to transmit the HID code to the second data transmission interface 54 of the electronic appliance 32. After the electronic appliance 32 receives the HID code, the logic unit 58 will execute the corresponding operation such as executing the operation of displaying the corresponding picture according to a process result of the driving program 56.

The remote controller 30 of the present invention can be designed as a phone-like remote controller, the cost of keypads needed for manufacture of the remote controller 30 can be reduced. Also, there is no additional opening required on the external architecture of the remote controller 30. This facilitates a waterproof design that can be achieved as needed. Furthermore, a shape changing cover can be installed to the external portion of the input panel 36 to increase the touch of the virtual key area, and to add graphic designs on the input panel 36 to improve differentiation on the virtual key area. Also, the input panel 36 can utilize a backlight design so that the user can easily differentiate the position of the virtual key area.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A remote controller with a communication function comprising:
   an input module comprising:
      an input panel; and
      a controller, coupled to the input panel, for generating coordinate information corresponding to inputs inputted to the input panel;
   a data transmission interface for transmitting data to an electronic appliance;
   a microphone for converting sound waves into audio signals;
   a speaker for converting audio signals into sound waves;
   an image capturing module for capturing and converting image of a user to image signals;
   an image display module for converting image signals of a remote user received to an image; and
   a control unit, coupled to the input module, the data transmission interface, the microphone, the speaker, the image capturing module, and the image display module for controlling the data transmission interface to transmit audio or image signals and data corresponding to the coordinate information generated by the controller to the electronic appliance.

2. The remote controller of claim 1 wherein the input panel is a touch pad, and the controller is a touch pad controller.

3. The remote controller of claim 1 wherein the input module for inputting a mode control code corresponding to a remote control mode of the remote controller further comprises a mode input interface for inputting the mode control code.

4. The remote controller of claim 3 wherein the mode input interface inputs the mode control code corresponding to a phone mode so as to switch the remote controller to the phone mode.

5. The remote controller of claim 3 wherein the mode input interface inputs the mode control code corresponding to a handwriting input mode so as to switch the remote controller to the handwriting input mode.

6. The remote controller of claim 3 wherein the mode input interface inputs the mode control code corresponding to a cursor mode so as to switch the remote controller to the cursor mode.

7. The remote controller of claim 3 wherein the mode input interface inputs the mode control code corresponding to the remote control mode so as to switch the remote controller to the remote control mode.

8. The remote controller of claim 3 wherein the mode input interface inputs the mode control code corresponding to a graphic input mode so as to switch the remote controller to the graphic input mode.

9. The remote controller of claim 3 further comprising a display module, coupled to the control unit, for displaying mode information corresponding to the mode control code inputted by the mode input interface.

10. The remote controller of claim 1 wherein the data transmission interface is selected from the group of a wireless data transmission interface.

11. The remote controller of claim 1 wherein the data transmission interface is selected from the group of a wired data transmission interface.

12. The remote controller of claim 1 further comprising a handwriting recognition controller, coupled to the controller, for converting the coordinate information into corresponding human interface device code (HID code) or character code.

13. The remote controller of claim 1 wherein the remote controller is a voice over Internet protocol (VoIP) phone.

14. The remote controller of claim 1 wherein the remote controller is a public switched telephone network (PSTN) phone.

* * * * *